United States Patent
Ball, IV

(10) Patent No.: US 9,833,727 B1
(45) Date of Patent: Dec. 5, 2017

(54) OILFIELD TREATMENT VESSEL FOR REMOVING WATER FROM OIL

(71) Applicant: Breakthrough Engenuity, LLC, Bixby, OK (US)

(72) Inventor: Will D. Ball, IV, Bixby, OK (US)

(73) Assignee: Breakthrough Engenuity, LLC, Bixby, OK (US)

( * ) Notice: Subject to any disclaimer, the term of this patent is extended or adjusted under 35 U.S.C. 154(b) by 0 days.

(21) Appl. No.: 14/949,947

(22) Filed: Nov. 24, 2015

(51) Int. Cl.
*C10G 33/06* (2006.01)
*B01D 17/02* (2006.01)
*B01D 19/00* (2006.01)
*B01D 17/04* (2006.01)

(52) U.S. Cl.
CPC ..... *B01D 17/0214* (2013.01); *B01D 17/0217* (2013.01); *B01D 17/042* (2013.01); *B01D 17/045* (2013.01); *B01D 19/0052* (2013.01); *B01D 17/0211* (2013.01); *B01D 19/0057* (2013.01)

(58) Field of Classification Search
CPC B01D 17/045; B01D 17/042; B01D 17/0211; B01D 17/0214; B01D 17/0217; B01D 19/0057; B01D 19/0063; B01D 19/02; E21B 43/34; C10G 33/06; C10G 33/00
See application file for complete search history.

(56) References Cited

U.S. PATENT DOCUMENTS

| | | | |
|---|---|---|---|
| 3,389,536 A | 6/1968 | Bull | |
| 3,418,252 A | 12/1968 | Francis | |
| 3,727,382 A * | 4/1973 | Jackson | C10G 33/06 96/174 |
| 4,012,207 A | 3/1977 | Jones | |
| 4,329,159 A | 5/1982 | Bull | |
| 4,396,404 A | 8/1983 | Engelman et al. | |
| 4,919,777 A | 4/1990 | Bull | |
| 4,995,495 A | 2/1991 | Krynski | |
| 5,256,171 A * | 10/1993 | Payne | B01D 19/0057 95/157 |
| 5,507,958 A | 4/1996 | White-Stevens | |
| 6,187,079 B1 | 2/2001 | Bridger | |
| 6,207,032 B1 | 3/2001 | Buchanan | |
| 6,315,898 B1 | 11/2001 | Bull | |
| 6,533,929 B2 | 3/2003 | Binsfeld et al. | |
| 8,465,572 B1 | 6/2013 | Ball, IV et al. | |
| 8,470,080 B1 | 6/2013 | Ball, IV et al. | |
| 2005/0023228 A1* | 2/2005 | Fenwick | B01D 17/00 210/802 |

* cited by examiner

*Primary Examiner* — Terry K Cecil
(74) *Attorney, Agent, or Firm* — Margaret Millikin; Millikin McKay PLLC

(57) ABSTRACT

The present invention is a single oilfield treatment vessel for removing water, solids and gas from crude oil. The vessel functions to replace three separate normally used vessels: a gas separator, a free water knockout vessel and a heater treater. The present vessel functions more efficiently than the three vessels it replaces by virtue of its superior internals and efficiency based design. It pays for itself more quickly by increasing the quality and value of the effluent fluids and by reducing installation and operating costs.

12 Claims, 1 Drawing Sheet

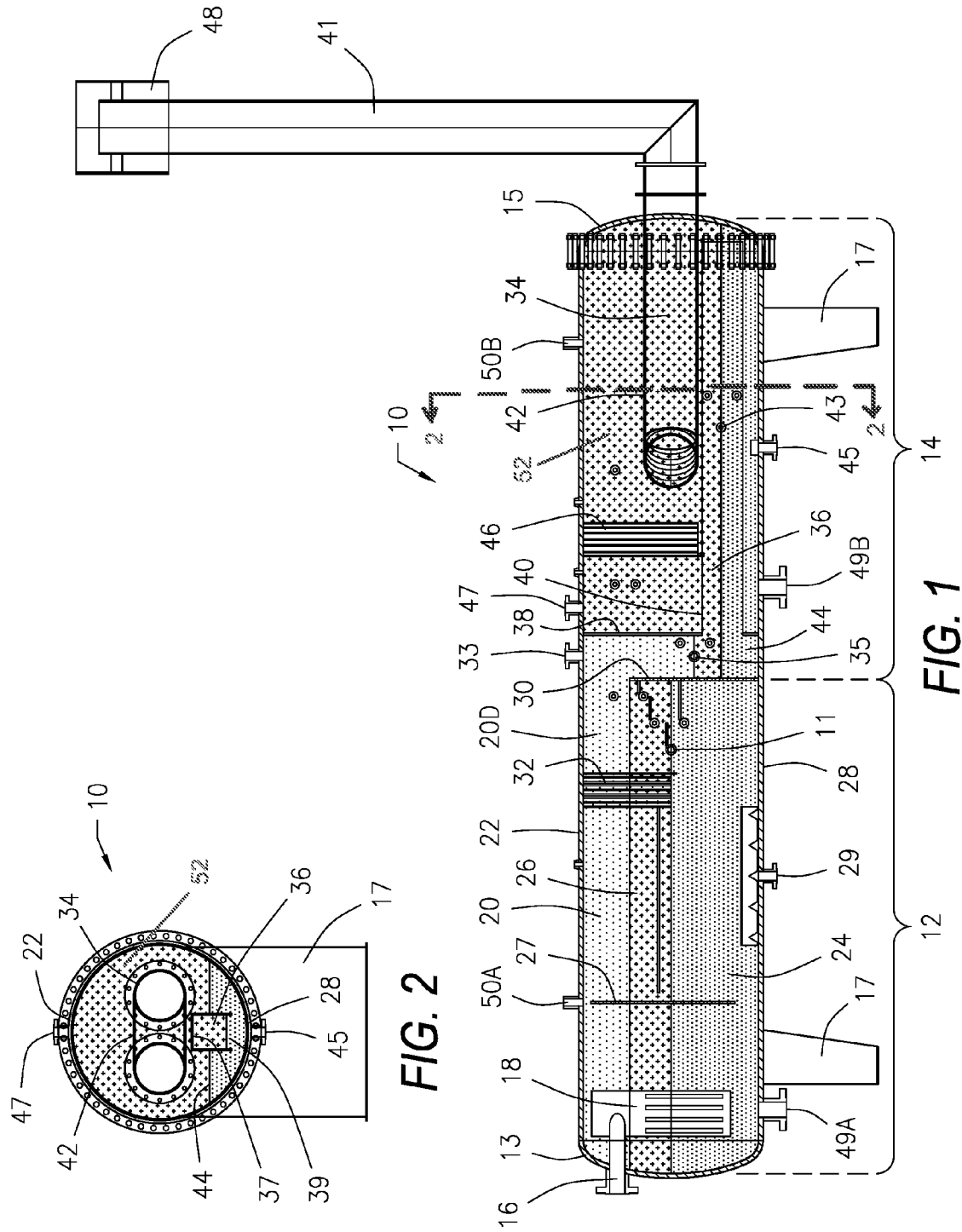

OILFIELD TREATMENT VESSEL FOR REMOVING WATER FROM OIL

BACKGROUND OF THE INVENTION

1. Field of the Invention

The present invention is an oilfield treatment vessel for removing water from oil that functions to replace three separate vessels: a gas separator, a free water knockout vessel and a heater treater. The present vessel functions more efficiently than the three vessels it replaces and pays for itself rapidly by reducing installation costs.

2. Description of the Related Art

For the first time ever the present invention has combined the best features of a gas-liquids separator, a free water knockout (FWKO) vessel, and an oilfield heater treater. In most oilfield production operations the use of three individual gas-liquids separators has been considered normal and standard. These individual vessels remove the gas associated with the liquids production, remove easily separated water in a "free water knockout" (aka FWKO), and remove water and emulsion for crude oil in an individual heater treater that heats the liquids to lower viscosity of the oil phase thereby increasing water and emulsion separation rates. This has been the norm for nearly 100 years!

Most oilfield processing has always been accomplished in vertical vessels. In the middle of the last century oilfield process equipment designers discovered that horizontal vessels are at least three times more efficient separators than vertical vessels. Only the paradigm of "we always did it that way" kept the use of vertical vessels like gas separators and vertical heater treaters alive. However, the new millennium is overcoming many of the paradigms of the past, particularly now as the industry strives for higher efficiency and lower costs. The paradigm of individual vessels is costly. It is costly to use three vessels with three sets of controls, three sets of relief valves, three sets of sight glasses, and three sets of fluid control valves. When you add to this three installation costs, and the concept of combining all three vessels into a single horizontal vessel begins to make economic sense. Add to this 21st century vessel internals, and the "three times advantage" increases to five times, or more. Eventually, the use of single vessels may make the use of three separate vessels obsolete.

So, the present invention is a three-in-one vessel. Since it is a three phase separator with an emphasis on removing gas from liquids, free water from oil, and a crude oil heated dehydrator, it can be considered a separator, a FWKO, and a heater treater all combined into one vessel. The present invention will separate up to 6MMSCFD from incoming liquids, and is assisted by its unique hydrocyclone centrifugal inlet diverter and the serpentine vane demisting system, considered to be the ultimate of demisting and coalescing systems. These parallel angular plate vane systems are the most efficient and forgiving demisters known to exist today. They are also self-cleaning. Demisting is important because removing oil mist from gas prevents oil carryover and loss of revenue. Most separators use lesser efficient demisters, and therefore carry over between 0.1 and 1.0 barrel of crude oil each and every day resulting in a loss to the producer of between $2,200 and $22,000 each year. Over the 20 expected life of the typical separator this adds us to between $43,800 and $438,000. Thus, carryover losses almost always exceed the cost of the vessel. So, preventing carryover increases revenue and reduces the loss of valuable hydrocarbons. The present invention prevents these losses through the use of its unique centrifugal inlet momentum absorber and its full diameter serpentine vane demister.

And, since the invention is preventing oil carryover in the outlet gas stream with the use of its serpentine vanes, by extending these vanes below the gas phase and through the oil layer the vanes remove all of the free water in the oil and most of the water of emulsion in the oil. Adding a few more inches of depth in these serpentine vanes adds very little cost, but results in a huge economic benefit for the present invention in its oil treating capacity and effluent oil quality. This results is more oil throughput and lower BS&W in the sales oil, making the present invention more efficient than any other previous oil treatment vessel.

History shows that most significant and predictable problems with standard heater treaters are 1) firetube failures and 2) firetube gasket leaks. The present invention solves both of these problems.

Most firetubes are made from steel pipe. They tend to fail because the firetube is placed in water and the water corrodes the tube or its mineral salts precipitate on the hot surface of the pipe creating hot spots which overheat and cause the pipe to fail. The firetube of the present invention is located exclusively in oil. Since there it is little or no water in contact with the firetube, there is little or no corrosion to the firetube and thus firetubes last indefinitely without failures.

Conventional firetube gaskets fail because firetube flanges and flange gaskets are shop fabricated and ovular in shape rather than being round ANSI standards. The present invention uses no oval firetube flanges or home-made firetube flange gaskets. Instead, the present invention uses only full diameter 48" ANSI 150 raised face flanges with an ANSI 150 spiral wound gasket. This solves the problem of firetube gasket leaks.

In addition to solving the firetube gasket leak problem, the 48" flange set gives the owner full open 100% access to the entirety of the present vessel instead of the normal 16" or 24" round manways which make ingress and egress far more difficult and dangerous when servicing the interior of the vessel.

The ultimate goal in all oilfield operations is to get the maximum volume of the highest quality produced crude oil to market at the lowest cost and in the fastest time frame. The present invention does this more efficiently than any group of conventional units. This all starts with the initial removal of produced gas to enhance liquid-liquid separation, the separation of all freely separable water from oil and all inlet oil being uniformly distributed directly under the firetube of the present invention to incur maximum heating efficiency to enhance viscosity reduction and oil quality. The oil does not pass through the water layer in the heated section of the present invention as it does in most conventional heater treaters. This benefit insures that no additional water is picked up by the flowing oil. Instead, the inlet oil is distributed into the oil layer where it is heated and where it dehydrates most rapidly.

As the heat lowers the viscosity of the crude, the heavier water falls out. The more the heat the lower the viscosity, and the faster the water separation. This is where most heater treaters stop, but not in the present invention. The present invention routes all oil through a second serpentine vane section to make sure the basic sediment and water (BS&W) concentration in the outlet oil is as low as possible. In most cases the BS&W content of the outlet oil is below 0.1%. The difference between 0.5% and 0.1% BS&W in 400 BOPD is worth just over $35,000 each year to the owner in price penalty deductions. And, with excess BS&W penalties in the $3-$15/barrel range, selling 400 BOPD of off-spec oil now with a $3 penalty in selling price, the present invention will save the typical owner over $438,000 each year. This type of savings will pay for the present invention many times over the life of its use.

In conclusion, the present invention functions as three vessels in one. It has more process capacity and produces higher quality oil and gas than three conventional vessels. The owner pays only for only one installation with the present invention instead of three as would be the case with three conventional vessels. And, the present invention processes more oil, gas, and water in a smaller, more efficient vessel that maximizes cash flow and pays for itself quickly.

SUMMARY OF THE INVENTION

The present invention is an oilfield fluids treatment vessel used to remove natural gas from liquids and water from oil that functions to replace three separate vessels: a gas separator, a free water knockout vessel, and a heater treater vessel. The present invention vessel is horizontal with two inter-connected sections or areas: a separation area at the inlet end of the vessel and a heated area at the opposite end of the vessel.

The vessel's inlet introduces an oilfield stream into the separation area of the vessel which enters the separation area through a unique centrifugal inlet diverter. This device absorbs the inlet momentum of the fluid stream. The incoming stream contains gas, oil, water and particulate material or solids. The solids are primarily formation sand from the oil bearing rock. The centrifugal inlet diverter causes the gas to gently disengage from the liquids and causes the oil and water to separate from each other. The gas, being lighter rises up the center area of the centrifugal inlet diverter, with the liquids and solids fall downward into the liquid and solids areas of the vessel. Thus, the incoming stream is separated within the separation area into a gas layer that is located at the top of the vessel, an oil layer in the middle of the vessel, and finally water and solids layers are located in the lowest area near the bottom of the vessel.

A constant oil-water interface level is maintained at an elevation below an oil spill-over weir that is located on the opposite end of the vessel from the inlet diverter. In one version of the present invention the weir extends upward from the bottom of the vessel and into the upper half of the vessel and serves to hold the water layer within the separation area of the vessel while allowing the oil layer to flow over the weir into the heated area of the vessel. The solids and water are removed from the bottom of the vessel through individual outlet nozzles between the inlet and the weir. The oil overflows the weir and leaves the vessel through it dedicated connection.

In a second version of the present invention the weir is divided such that oil spills over into one half while water spills into the other. Water and oil still leave the vessel through dedicated nozzle connections; in this case in each compartment.

Initially, the gas component flows through a vane coalescer located within the first separation area of the vessel. The vane coalescer extends downward from the top of the vessel and into the oil layer. As the gas layer flows through the vane coalescer, the gas is demisted, thereby recovering valuable liquid oil mist droplets which drain into the oil layer below the gas layer. The demisted gas layer is then removed from the top of the primary separation compartment of the vessel. The exiting gas may be sold, compressed, further processed, flared or may be used for fuel to fire the vessel's firetube burner as will be more fully described hereafter.

The oil layer flows over the weir into an oil distribution box located at the bottom of the heated area in the second compartment of the vessel and in between the weir and a partitioning wall or baffle that extends across the vessel which is located immediately downstream of the weir. The partitioning wall is provided with an opening into the oil distribution box. It is through this opening in the partitioning wall that the oil enters the oil distribution box after flowing over the weir. The partitioning wall serves to separate the primary gas and water separation area of the vessel from the secondary heated section of the vessel, serves to direct the oil that passes over the weir into the oil distribution box, and serves to prevent heated oil from the heated area of the vessel from reentering the separation area.

The oil flows into the distribution box and is metered out of the distribution box through a series of metering orifices in the box and exits the distribution box underneath a u-tube firetube that is located within the heated area. The firetube is fitted with a burner which is supplied internally with fuel which burns within the firetube. The heat from the flames is radiated through the firetube. The hot exterior surface of the firetube heats the oil located within the heated area of the vessel. As the oil is heated, its viscosity, a measure of oil thickness, is reduced allowing the heavier water that may be entrained within the oil to more rapidly fall to the bottom of the vessel forming a water layer in the heated area of the vessel surrounding and below the oil distribution box. The water is then removed from the bottom of the vessel so that the water level is constantly maintained below the firetube and covers the majority of the distribution box, assuring uniform metering of the oil through the metering orifices.

The heated oil rises and flows upward and across the hot surface of the firetube, is heated and passes through a second vane coalescer which causes any additional water to coalesce and to be removed from the oil. Water removed by the second vane coalescer falls down to the water layer at the bottom of the heated area of the vessel and is removed. Upon passing through the second vane coalescer, the resulting dehydrated crude oil then exits the top of the vessel in the heated area of the vessel and flows on to storage from which it is sold.

BRIEF DESCRIPTION OF THE DRAWINGS

FIG. 1 is a diagram of an oilfield treatment vessel for removing water from oil that is constructed in accordance with a preferred embodiment of the present invention.

FIG. 2 is a cross sectional view of the vessel taken along line 2-2 of FIG. 1 showing the oil distribution box located under the firetube within the heated area of the vessel.

DETAILED DESCRIPTION OF THE PREFERRED EMBODIMENT

Referring now to FIG. 1, there is illustrated an oilfield treatment vessel 10 that is constructed in accordance with a preferred embodiment of the present invention. The vessel 10 is designed for removing water from oil and functions to replace three separate vessels: a gas separator, a free water knockout vessel and a heater treater. The vessel 10 is a horizontal tank that has two general areas: a separation area 12 at the inlet end 13 of the vessel 10 and a heated area 14 at the opposite end 15 of the vessel 10. As shown in the drawing, the vessel 10 is generally supported above the ground on tank support legs or saddle 17.

The vessel has an inlet 16 that introduces into the separation area 12 of the vessel 10 an oilfield stream which enters the separation area 12 through a centrifugal inlet diverter 18. The incoming stream contains gas, oil, water and particulate material or solids which is primarily sand. The centrifugal inlet diverter 18 causes the gas to disengage from the liquids and causes the oil and water to separate from each other, with the solids falling downward into a water layer of the vessel 10. Thus, the incoming stream is separated within the separation area 12 into a gas layer 20 that is located at the top 22 of the vessel 10, a water layer 24 that is located at the bottom of the vessel 10 and also contains the solids, and an oil layer 26 that is located approximately midway between the top 22 of the vessel and the bottom 28 of the vessel 10 and is located between the gas layer 20 and water layer 24.

A perforated wave breaker or redistributor 27 is located within the separation area 12 downstream of the centrifugal inlet diverter 18. The wave breaker 27 serves to prevent remixing of the liquids as they flow through the separation area 12.

The solids and water are removed from the bottom 28 of the vessel 10 in the separation area 12 via a first water outlet 29 so that a constant oil-water interface level is maintained at an elevation that is below a weir 30 that extends across a lower half of the vessel 10 and serves to divide the separation area 12 of the vessel 10 from the heated area 14 of the vessel 10. The weir 30 is provided approximately midway between the inlet end 13 and the opposite outlet end 15 of the vessel 10. The weir 30 extends upward from the bottom 28 of the vessel 10 and into the lower half of the vessel 10 and serves to hold the water layer 24 within the separation area 12 of the vessel 10 while allowing the oil layer 26 to flow over the weir 30 and enter into the heated area 14 of the vessel 10. A first level controller 11 regulates the oil-water interface within the separation area 12.

The gas layer 20 flows through a first vane coalescer 32 that is located in the separation area 12 of the vessel 10. The first vane coalescer 32 extends downward from the top 22 of the vessel 10 and into the oil layer 26. As the gas layer 20 flows through the first vane coalescer 32, the gas is demisted, thereby recovering into the oil layer 26 droplets of oil that were previously entrained in the gas layer 20. The demisted gas layer 20D is then removed from the top 22 of the vessel 10 via a gas outlet 33. The exiting demisted gas layer 20D may be used to fire the vessel's firetube 34, as will be more fully described hereafter, or may be used for other purposes.

Referring also to FIG. 2, the oil layer 26 flows over the weir 30 into an oil distribution box 36 located at the bottom 28 of the vessel 10 in the heated area 14 of the vessel 10. A partitioning wall 38 that extends across the vessel 10 is located immediately downstream of the weir 30. The partitioning wall 38 is provided with an opening 40 that communicates with the oil distribution box 36. It is through this opening 40 in the partitioning wall 38 that the oil enters the oil distribution box 36 after flowing over the weir 30. The partitioning wall 38 serves to separate the separation area 12 of the vessel 10 from the heated area 14 of the vessel 10, serves to direct the oil that passes over the weir 30 into the oil distribution box 36, and serves to prevent heated oil located in the heated area 14 of the vessel 10 from reentering the separation area 12.

A second level control 35 located between the weir 30 and the partitioning wall 38 maintains the demisted gas-oil interface between the demisted gas layer 20D and the oil that has spilled over the weir 30 and has not yet entered the oil distribution box 36. This second level control 35 is important as it serves to maintain the proper amount of pressure on the oil to push it through and into the heated area 14 of the vessel 10, completely filling the heated section of the vessel. This second level control 35 controls an oil outlet valve (not illustrated) attached to the oil outlet 47 which allows treated oil to leave the heated section 14 of the vessel 10.

The oil flows through the oil distribution box 36 and exits the oil distribution box 36 at a location underneath the u-tube firetube 34 which is located within the heated area 14. The firetube 34 is fitted with a burner which is supplied internally with fuel which burns within the firetube 34, thereby causing the exterior surface 42 of the firetube 34 to become hot. Flue gases from the burning of fuel within the firetube 34 are vented through a firetube stack 41 that is preferably equipped with an anti-downdraft stack cap 48 to prevent wind from affecting the burner.

The oil distribution box 36 is provided with distribution holes 37 on its two vertical sides near its top that allow oil to flow out of the distribution box into the target distribution area 52, and upward around the firetube. The bottom 39 of the oil distribution box 36 is open to allow separated water to fall downward to the bottom 28 of the vessel to form a another water layer 44 within the heated area 14 of the vessel 10.

The hot exterior surface 42 of the firetube 34 heats the oil located within the heated area 14 of the vessel 10. As the oil is heated, the heavier water that may be entrained within the oil will fall to the bottom 28 of the vessel 10 and enter the water layer 44 in this section; the second water layer. The water in the second water layer 44 is then removed from the bottom 28 of the vessel 10 via a second water outlet 45 so that the water level is constantly maintained below the firetube 34. A third level controller 43 regulates the oil-water interface within the heated area 14 letting water out of the second water layer as it accumulates.

The heated oil rises up around the firetube 34 and flows upward and back toward the middle of the vessel where it passes through a second vane coalescer 46 which causes any remaining entrained water to be removed from the oil. Upon passing through the second vane coalescer 46, the resulting oil then exits the top 22 of the vessel 10 in the heated area 14 of the vessel 10 via an oil outlet 47 near the middle of the vessel. Water removed by the second vane coalescer 46 falls down to the second water layer 44 at the bottom 28 of the heated area 14 of the vessel 10 and is removed via the second water outlet 45.

The arrangement of the features in the vessel 10 allow the outlet end 15 of the vessel 10 to be fitted with a 48 inch ANSI 150 raised face flange set so the entire end of the heated area 14 of the vessel 10 can be removed for inspections and servicing. The vessel 10 is also provided with drains 49A and 49B located at the bottom 28 of the vessel 10 in the separation area 12 and the heated area 14, respectively, as a means of draining the contents of the vessel 10 when taking it out of service. Additionally, the vessel 10 is provided with relief valves 50A and 50B located at the top 22 of the vessel 10 in the separation area 2 and the heated area 14, respectively.

While the invention has been described with a certain degree of particularity, it is manifest that many changes may be made in the details of construction, the controls used to manage the levels and pressures, and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An oilfield treatment pressure vessel for removing water from oil comprising:
   a horizontal tank having a top and a bottom and separated internally into a separation area at an inlet end of the tank and a heated area located at an opposite outlet end of the tank,
   an inlet at the inlet end of the tank that feeds into a centrifugal inlet diverter for controlling three phase flow of liquids, gasses and solids,
   a weir provided approximately midway of the tank that extends upward from the bottom of the tank and into the lower half of the tank, a partitioning wall extending across the tank and located immediately downstream of the weir to separate the separation area from the heated area of the tank,
   a first vane coalescer located within the separation area between the inlet and a gas outlet of the tank, said first vane coalescer extending downward from the top of the tank for demisting a separated gas layer and comprising parallel angular plates for coalescing oil,
   an opening in the partitioning wall communicating between the weir and an oil distribution box located at the bottom of the heated area of the tank,
   distribution holes provided in a target distribution area under a firetube located within the heated area, and
   a second vane coalescer extending downward from the top of the tank and comprising parallel angular plates located between the firetube and an oil outlet provided in the heated area of the tank, the gas and oil outlets extending through the top of the tank and positioned on opposite sides of the partitioning wall.

2. An oilfield treatment vessel according to claim 1 further comprising:
   a first water outlet located in the separation area of the tank for discharging water and solids from the bottom of the tank.

3. An oilfield treatment vessel according to claim 2 further comprising:
   a second water outlet located in the heated area of the tank for discharging water from the bottom of the tank.

4. An oilfield treatment vessel according to claim 3 further comprising:
   a wave breaker provided within the separation area and between the inlet diverter and the first vane coalescer.

5. An oilfield treatment vessel according to claim 4 wherein said oil distribution box is open on its bottom side.

6. An oilfield treatment vessel according to claim 1 further comprising:
   a level controller for maintaining an oil-water interface within the separation area of the tank below a top of the weir.

7. An oilfield treatment vessel according to claim 6 further comprising:
   a level controller for maintaining an oil-water interface within the heated area of the tank below the firetube.

8. An oilfield treatment vessel according to claim 7 further comprising:
   a level controller for maintaining an oil-demisted gas interface between the weir and the partitioning wall.

9. An oilfield treatment vessel according to claim 8 wherein said oil distribution box is open on its bottom side.

10. An oilfield treatment vessel according to claim 9 further comprising:
    a first water outlet located in the separation area of the tank for discharging water and solids from the bottom of the tank.

11. An oilfield treatment vessel according to claim 10 further comprising:
    a second water outlet located in the heated area of the tank for discharging water from the bottom of the tank.

12. An oilfield treatment vessel according to claim 11 further comprising:
    a wave breaker provided within the separation area and between the inlet diverter and the first vane coalescer.

* * * * *